April 11, 1967 W. DE PALMA 3,313,336
THERMAL-CONTROLLED SAFETY GAS VALVE
Filed July 28, 1965
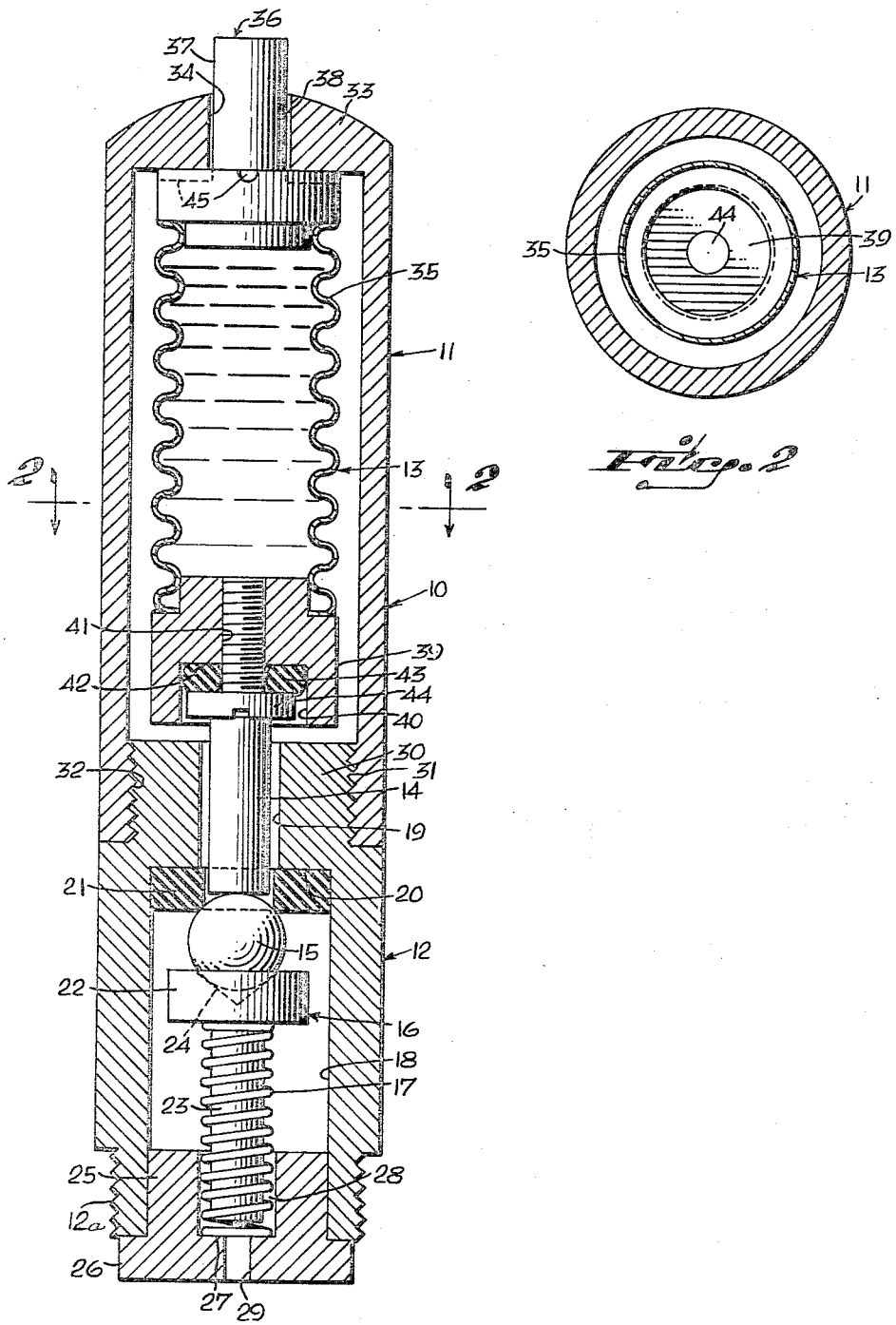
Fig. 1  Fig. 2
INVENTOR.
WILLIAM DE PALMA
BY
ATTORNEY.

3,313,336
THERMAL-CONTROLLED SAFETY GAS VALVE
William De Palma, 15 Hildreth Place,
Yonkers, N.Y. 10704
Filed July 28, 1965, Ser. No. 475,424
5 Claims. (Cl. 158—140)

My invention relates to gas burning devices and is directed particularly to an improved thermally-controlled shut-off valve for gas burners of the type operative upon the flame becoming extinguished for any reason, to prevent the escape of gas.

Automatic gas shut-off devices operative upon the burner becoming extinguished are known. Such devices as have heretofore been devised, however, are complex in that they require pilot burners or complicated mechanisms of one type or another to effect automatic closure of a main gas valve. The principal object of my invention is to provide a simplified thermally-actuated gas control safety valve that not only eliminates the need of a pilot burner, but also is comprised of a minimum number of parts all of which can readily be manufactured by automatic screw machine and the like mass production techniques.

A more particular object is to provide a thermally-controlled safety gas valve for use with ovens, ranges, water heaters, butane candles and the like wherein heat from a main gas jet, when ignited, is conducted to a thermally-actuated bellows operative to open a normally closed main gas valve and hold it open until such time as the flame becomes extinguished and the bellows thereupon cools again.

Yet another object is to provide a thermally-controlled safety gas valve of the character described which will be compact and attractive in appearance, easy to install, economical to manufacture, adaptable to a wide range of gas burner uses, and fool-proof and durable in operation.

Other objects, features and advantages of my invention will be apparent from the following description when read with reference to the accompanying drawings. In the drawings, wherein like reference numerals denote corresponding parts throughout the several views:

FIG. 1 is a vertical cross-sectional view of a typical thermally-controlled safety gas valve embodying the invention; and FIG. 2 is a horizontal cross-section taken along the line 2—2 of FIG. 1 in the direction of the arrows.

Referring now in detail to the drawings, 10 designates a preferred form of safety gas valve embodying my invention, the same comprising, generally, a tubular upper cover or housing portion 11, a cylindrical body or housing portion 12, a bellows member 13, an actuating rod or stem 14, a steel valve ball 15, a ball guide stem member 16 and a guide stem spring 17.

The cylindrical body portion 12, which is preferably of metal, is formed with a first axial bore 18 in the lower end communicating at its inner end with a second axial bore 19 of reduced diameter to form therewith an interior annular shoulder 20 against which is seated a rubber or neoprene O-ring 21. The guide stem member 16 is integrally formed with a cylindrical head portion 22 and a stem portion 23 of reduced diameter extending outwardly of one side of said head portion. The other side of said head portion is formed with a central, circular recess 24 within which is seated the underside of the steel valve ball 15, the guide stem member being disposed within the axial bore 18 in the cylindrical body portion 12. The body portion 12 has press-fitted within the lower end of its bore 18 a cylindrical plug member 25, said plug member being formed at its outer end with a flange portion 26 which seats against the outer end of said body portion. The helical guide stem spring 17 is a compression spring and is fitted over the stem portion 23 to bear at its upper end against the underside of the head portion 22 and at its lower end against an annular seat 27 defined by a first axial bore 28 in the inner end of the plug member 24, and a second axial bore 29 in the outer end of said plug member. The lower end of the cylindrical body portion 12 is externally-threaded, as indicated at 12a, for connection to a gas service line (not illustrated). The upper end of the cylindrical body portion 12 has a reduced diameter portion 30 which is externally-threaded, as indicated at 31, to receive threadedly secured thereon the lower end of the tubular upper cover portion 11, said upper cover portion having at its lower end an internally-threaded portion 32.

The upper or outer end of the upper cover portion 11 is integrally formed with a top wall portion 33 having a central round opening 34 which, as hereinbelow described, provides, in combination with the bellows member 13, an annular orifice 38 for the gas jet.

The bellows member 13 is comprised of a stainless steel, monel metal or the like tubular bellows portion 35 the upper end of which has welded thereto a cylindrical steel bellows head 36 which serves to seal off the upper end of said bellows portion. The bellows head 36 is integrally formed with an outwardly-extending, coaxial tip portion 37 of slightly smaller diameter than that of the round opening 34 in the upper cover portion 11, and projects therethrough to define the annular gas orifice 38.

The lower end of the bellows portion 35 is closed off by a cylindrical bellows plug member 39 of the same external diameter as that of said bellows portion, said plug member preferably being welded to said bellows portion. The outer end of the plug member is formed with an axial bore 40 through the bottom of which extends a reduced diameter, internally-threaded, axial through opening 41. The bore 40 and threaded opening 41 define at their juncture an interior annular seat 42 fitted against which is a rubber or neoprene O-ring 43 secured in place by a flat-headed machine screw 44 threaded in the opening 41. The rod or stem 14 is disposed within the bore 19 with its upper end in abutment with the flat-headed machine screw 44, and its lower end in abutment with the upper end of the steel valve ball 15.

The interior of the bellows member 13 is filled with a material having a high coefficient of thermal expansion, such as mercury, gas, oil or the like, through the plug opening 41, after which it is sealed off by the flat-headed machine screw 44 gasketed by the O-ring 43.

In use, the threaded end 12a of the safety gas valve will be connected to a gas line for supplying gas under pressure in the chamber defined by the bore 18. The bellows member 13 together with the rod or stem 14 are normally not of a sufficient length to unseat the valve ball, so that said valve ball will be held in seating or sealing engagement with the O-ring 21 by action of the compression guide stem spring 17. In order to start the flow of gas at the orifice 38 for ignition, it is only necessary to push down upon the protruding tip portion 37 of the bellows member 13, thereby unseating the valve ball 15 to permit gas to flow through the axial bore 19, into the upper housing portion 11 and out through said orifice. As soon as the gas stream is ignited, the heat given off is conducted down to the bellows portion 35 to heat the expandable contents therein, thereby expanding said bellows portion sufficiently to maintain the valve ball 15 in unseated relation with respect to its valve seat to allow continued flow of gas after the downward pressure upon the tip portion 37 of the bellows is released. The upper annular surface portion of the bellows head 36 is provided with radial grooves 45 to permit the passage of gas from the interior of the housing portion 11 into the annular gas orifice upon release of the tip portion 37 of the bellows member 13 after igniting the gas jet. Ignition can also be accomplished by heating the bellows tip 37 with a match flame, thereby eliminating the need to push down on said tip as described above.

While I have illustrated and described herein only one form in which my invention can conveniently be embodied in practice, it is to be understood that this form is given by way of example only, and not in a limiting sense. My invention, in brief, comprises all the embodiments and modifications coming within the scope and spirit of the following claims.

What I claim as new and desire to obtain by Letters Patent is:

1. A thermally-controlled safety gas valve comprising, in combination, an elongated housing member having a jet opening at one end and means for connection to a source of gas at the other end, said housing member having an interior opening for the passage of gas through said housing member to said jet opening, a valve in said interior opening and movable between closed and open positions with respect to the passage of gas through said housing member, and thermally-responsive means controlled by heat given off by an ignited stream of gas passing through said jet opening for holding said valve in open position, said thermally-responsive means comprising a cylindrical bellows in said housing member containing a material having a high coefficient of heat expansion, said bellows having secured to one end a head member formed with a tip portion extending through said jet opening, and means including said bellows for moving said valve, when in said closed position, to said open position upon pushing in upon said tip portion.

2. A thermally-controlled safety gas valve as defined in claim 1 wherein said valve comprises an annular valve seat facing said other end of said housing member, a spherical ball movable against said annular valve seat from said other end of said housing member, and means resiliently urging said ball in seating engagement against said valve seat.

3. A thermally-controlled safety gas valve comprising, in combination, an elongated housing member having a jet opening at one end and means for connection to a source of gas at the other end, said housing member having an interior opening for the passage of gas through said housing member to said jet opening, a valve in said interior opening and movable between closed and open positions with respect to the passage of gas through said housing member, thermally-responsive means controlled by heat given off by an ignited stream of gas passing through said jet opening for holding said valve in open position, said valve comprising an annular valve seat facing said other end of said housing member, a spherical ball movable against said annular valve seat from said other end of said housing member, and means resiliently urging said ball in seating engagement against said valve seat, said thermally-responsive means comprising a cylindrical bellows axially arranged within said housing member between said valve and said one end thereof, said bellows containing a material having a high coefficient of heat expansion, said bellows having at one end a tip member extending through said jet openings, and an abutment rod between said other end of said bellows and the seating end of said ball for unseating said ball upon the downward movement of said bellows.

4. A thermally-controlled safety gas valve as defined in claim 3 wherein said means for resiliently urging said ball in seating engagement comprises a ball guide stem member having at one end a head portion abutting the outside of said ball and an integral stem portion, and a helical compression spring circumjacent said stem portion and acting between the underside of said head portion and said other end of said housing.

5. A thermally-controlled gas valve as defined in claim 4 wherein said jet opening is circular in form and wherein said bellows tip member is of cylindrical form of lesser diameter than the diameter of said jet opening to provide an annular opening for the passage of gas.

References Cited by the Examiner

UNITED STATES PATENTS

| | | | |
|---|---|---|---|
| 779,250 | 1/1905 | Anderson | 67—116 |
| 787,687 | 4/1905 | Nemo | 67—116 |
| 1,137,551 | 4/1915 | Taby et al. | |
| 1,403,351 | 1/1922 | Smith | 67—116 |
| 2,294,163 | 8/1942 | Donnelly et al. | |
| 2,342,659 | 2/1944 | Grove et al. | |

FREDERICK KETTERER, *Primary Examiner.*